United States Patent [19]
Anderson

[11] 3,994,148
[45] Nov. 30, 1976

[54] COMBINED ANTI-THEFT AND MOUNTING ASSEMBLY FOR A CB RADIO DEVICE

[76] Inventor: Lyle V. Anderson, 122 Carriage Drive, Pittsburgh, Pa. 15237

[22] Filed: Feb. 25, 1976

[21] Appl. No.: 661,313

[52] U.S. Cl. .................................. 70/58; 248/203
[51] Int. Cl.² ........................................ E05B 73/00
[58] Field of Search ............... 70/58, 25 B, 229, 232, 70/DIG. 57, DIG. 58; 248/203; 211/4

[56] References Cited
UNITED STATES PATENTS

| | | | |
|---|---|---|---|
| 3,370,446 | 2/1968 | Francis | 70/58 |
| 3,410,122 | 11/1968 | Moses | 70/58 |
| 3,563,070 | 2/1971 | Earl | 70/232 |
| 3,822,049 | 7/1974 | Saunders | 248/203 |

Primary Examiner—Robert L. Wolfe
Attorney, Agent, or Firm—Brown, Murray, Flick & Peckham

[57] ABSTRACT

An anti-theft and mounting assembly is employed to attach a CB radio receiver and transmitter onto the instrument cowl of a vehicle. The radio casing is secured to the side members of a U-shaped frame that also includes a bottom plate used to support an outwardly projecting lug carrying a key-operated lock. A rectangularly-shaped housing receives and supports the U-shaped frame together with the casing of the CB radio. A lock box on the bottom wall of the housing is totally enclosed by the lug and a stop plate in the box cooperates with the lock mechanism to interconnect the U-shaped frame and the housing while at the same time the lock permits authorized removal of the CB radio should the vehicle remain unattended for long periods of time.

6 Claims, 2 Drawing Figures

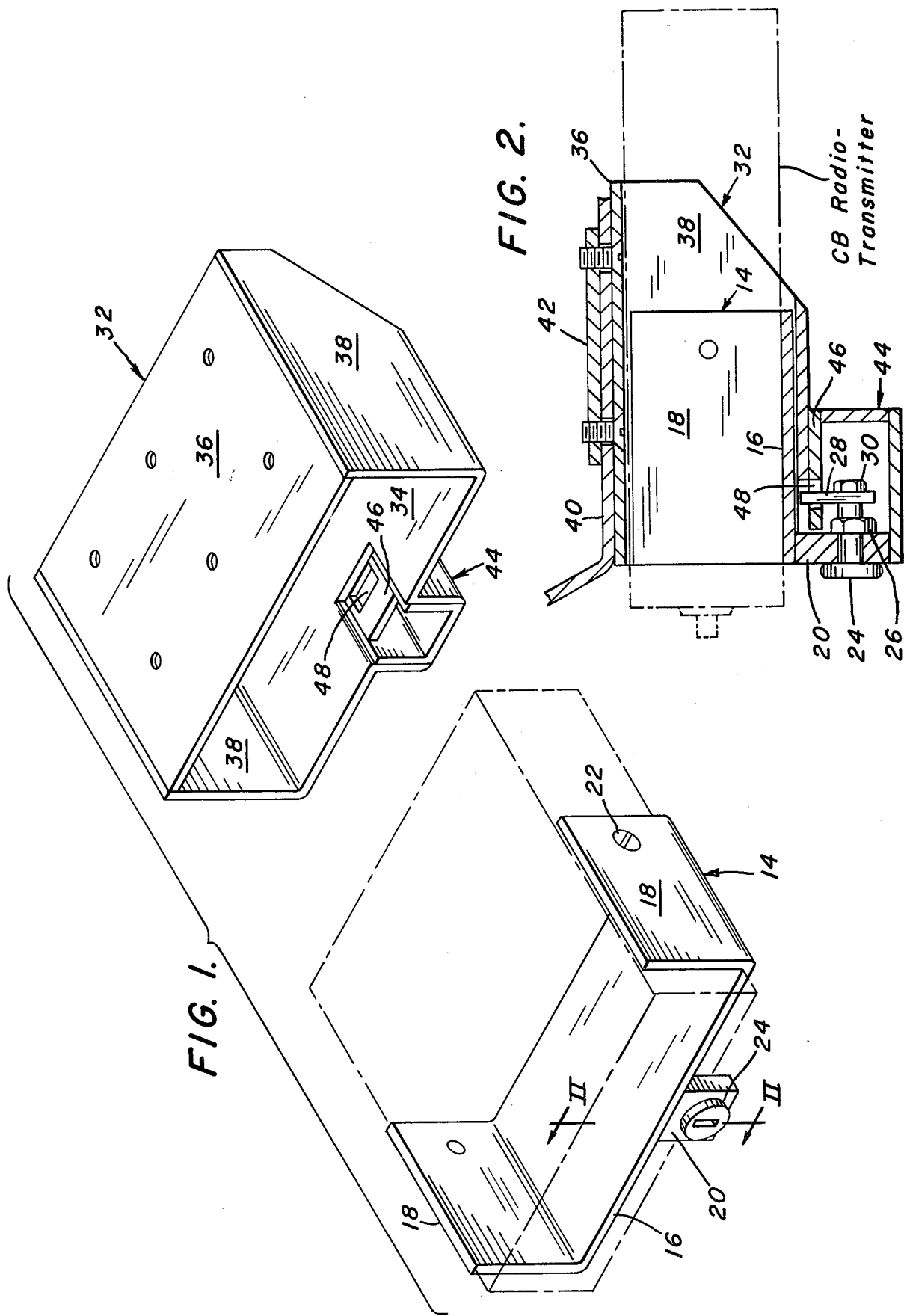

3,994,148

COMBINED ANTI-THEFT AND MOUNTING ASSEMBLY FOR A CB RADIO DEVICE

BACKGROUND OF THE INVENTION

This invention relates to a combination anti-theft and mounting assembly for a citizen's band radio receiver and transmitter of the type adapted for operation within a vehicle, such as an automobile, truck, or the like. More particularly, the present invention relates to a construction and arrangement of parts that inhibit access to threaded fastening members to thereby serve as a deterrent to unauthorized removal of the radio receiver and transmitter while at the same time provide a key-operated locking arrangement to permit authorized removal of the radio receiver and transmitter, for example, during such times as when the radio receiver is particularly susceptible to theft.

It is the usual practice to mount a citizen's band radio transmitter by a support bracket onto a suitable support surface, such as at the marginal edge of sheet metal forming the lower portion of the cowl in an automobile. Typically, a U-shaped bracket was first attached to the dashboard at a desired location and then the radio transmitter's unit was attached to the bracket by means of bolts passed through the bracket into tap holes formed in the casing of the radio unit. While a minimum of effort was required to install the radio unit, it is virtually just as simple to remove the radio unit which has given rise to a severe problem of theft. The fastening means, for example, are particularly susceptible to unauthorized access which does occur in many present-day communities when the automobile or other vehicle remains unattended for even a short period of time.

SUMMARY OF THE INVENTION

It is a principal object of the present invention to provide a mounting assembly for a citizen's band radio receiver and transmitter while at the same time such an assembly provides a large degree of anti-theft protection against unauthorized removal of the receiver and transmitter.

It is a further object of the present invention to provide a combination anti-theft and mounting assembly for a citizen's band radio receiver and transmitter wherein the assembly is constructed and arranged to provide a key-operated locking arrangement for authorized removal of the radio receiver and transmitter to thereby provide maximum protection when the vehicle must of necessity or for other reasons remain unattended for a long period of time.

It is still another object of the present invention to provide a combination anti-theft and mounting assembly for a citizen's band radio receiver and transmitter of the type adapted for operation within a vehicle such as an automobile wherein the assembly embodies a construction and robust arrangement of parts to provide a locked enclosure for unauthorized access to fastening devices employed to mount the assembly in place.

It is still another object of the present invention to provide for a citizen's band radio a combination anti-theft and mounting assembly which is designed to embody a minimal of parts which can be constructed in an economical manner while put into operative use by untrained personnel in a rapid and efficient manner without requiring alterations to the radio.

In accordance with the present invention, there is provided a combined anti-theft and mounting assembly for the casing of a citizen's band radio receiver and transmitter of the type adapted for attachment to and operation within a vehicle such as automobile, the combination comprising a frame including spaced-apart side members adapted for attachment to the casing of the radio receiver and transmitter while forming a nested relation in the frame, a lug projecting outwardly from the frame, a housing having top, bottom and side walls forming an open-ended compartment to receive and support the frame together with the casing of the radio receiver and transmitter, a wall of the housing carrying fastening means for support by the vehicle at a desired location, a lock box having walls secured to the housing, the lock box having an opening for receiving the lug, and lock means carried by the lug to project into the lock box for interlocking the housing and the frame.

The preferred form of the present invention further provides a stop bar carried by a wall of the lock box to form an open passageway adapted to receive a lock plate positioned in the lock box and controllably positioned by a key-operated lock forming the aforementioned lock means. The aforementioned frame preferably defines a U-shaped configuration whereby the projecting legs are attached by threaded fastening means to the casing of the radio receiver and transmitter. These threaded means as well as other fastening means used to attach the aforementioned housing to the vehicle are rendered inaccessible when the frame and the radio receiver and transmitter attached thereto are positioned and supported within the housing.

These features and advantages of the present invention as well as others will be more clearly understood when the following description is read in light of the accompanying drawings, in which:

FIG. 1 is an exploded perspective view of the parts forming the anti-theft and mounting assembly according to the present invention; and FIG. 2 is a sectional view taken along line II—II of FIG. 1.

In FIGS. 1 and 2, reference numeral 10 identifies a citizen's band radio receiver and transmitter which is a standard commercially-available unit having a unitary housing. Most known units of this type include a tapped hole formed in a side plate or the like to receive a threaded stud or, alternatively, a mounting bolt. The typical dimension of a CB unit of this type are 7 inches deep, 6 inches wide and 2 inches high. The mounting assembly of the present invention may be conveniently manufactured for various dimensioned units and suitable adapters such as spacers may be used to accommodate slight deviations to the physical dimensions between radio transmitters of approximately the same size.

The apparatus of the present invention includes a U-shaped frame 14 that essentially includes a bottom plate 16 that supports spaced-apart side members 18 that project from one side of the plate 16 and a lug 20 that projects from the other side of the plate. As clearly shown in FIG. 1, the lug 20 projects downwardly at a central location in a flush relation with the front edge of the plate 16. The spacing between the side members 18 is such that the CB radio transmitter unit 10 is received in a nested relation into the U-shaped configuration formed by the frame 14. Each side member 18 has a drilled hole 22 adapted to pass a fastening device such as a flathead machine screw into threaded engagement with the tapped hole formed in the side of the CB radio transmitter.

The lug 20 is employed as a support for a key-operated lock assembly 24. As can be clearly seen in FIG. 2, the lug 20 has an annular bore into which the lock assembly 24 is received and secured in place by a nut 26 at the back surface of the lug. Spaced outwardly from the nut 26 is a radially-extending latch plate 28 which is secured against a shoulder and the end of the lock assembly 24 by a nut 30.

The U-shaped frame 14 is dimensioned to fit in a closely-spaced relation within an open-ended compartment formed by a housing 32. The housing has a depth which is greater than the depth of the side members 18 so that the housing encloses, and thereby prevents access to, the fastening means 22. The housing 32 includes a top wall 34, a bottom wall 36 and side walls 38. The top wall 34 has a plurality of holes used to pass the threaded portions of flathead machine screws into similarly-arranged holes formed in the instrument cowl 40 and thence into the threaded holes in a plate 42. The cowl 40 typically may consist of the marginal edge at the underside of an instrument panel in an automobile or similar vehicle. The bottom wall 36 of the housing 32 supports a lock box 44 suitably formed with side and bottom walls but having an open front that is dimensioned to receive the lug 20 when the frame 14 is supported within the compartment provided by the housing 32. The thickness of the lug 20 is substantially increased as compared with the thickness of the side walls of the lock box. Any forced entry into the interior of the lock box, housing 32 or frame 14 will endanger the CB unit to destruction. The lock box further includes a top wall 46 that defines a slotted opening 48 that is positioned and dimensioned to receive the lock arm 28 to form an interlocking relation between the frame 14 and the housing 32 which is shown by the position of the parts in FIG. 2.

In light of the foregoing description, it is believed apparent that the lug 20 and the lock box 44 may be arranged at other locations as desired. Thus, for example, the lug 20 may be supported by a side plate 18 of the frame 14 to cooperate with a lock box supported by the side wall 38 of the housing 32. It is believed apparent that by employing the housing 32 to enclose the fastening means used to attach the frame 14 to the CB radio transmitter, when the frame and transmitter are in a locked position within the housing they also obscure and prevent access to the fastening means used to attach the housing in the desired location within the vehicle. In this way, should unauthorized persons gain access to the passenger compartment of an automobile, a definite deterrent to the theft of the CB radio unit is provided by the mounting assembly since such unauthorized persons cannot gain access to the fastening devices used to attach the radio unit to the vehicle. However, the radio unit can be unlocked by the owner and removed together with the frame 14 when, for example, it is known that the vehicle may be subject to possible unauthorized entry because it is unattended for a long period of time.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A combined anti-theft and mounting assembly for the casing of a citizen's band radio receiver and transmitter of the type adapted for attachment to and operation within a vehicle such as an automobile or the like, the combination comprising:
    a frame including spaced-apart side members adapted for attachment to said casing while forming a nested relation in said frame,
    a lug projecting outwardly from said frame,
    a housing having top, bottom and side walls forming an open-ended compartment to receive and support said frame together with said casing, a wall of said housing carrying fastening means for support by the vehicle at a desired location,
    a lock box having walls secured to said housing, said lock box having an opening for receiving said lug, and
    lock means carried by said lug to project into said lock box for interlocking said housing and said frame.

2. The combination according to claim 1 further comprising a stop bar carried by a wall of said lock box to form an open passageway therein, said lock means including a lock plate adapted to extend into said lock box to engage said stop bar and prevent relative movement between said frame and said housing.

3. The combination according to claim 1 wherein said frame has a bottom plate for interconnecting said side members to form a U-shaped configuration, said lug projecting downwardly from said bottom plate when said side members project upwardly therefrom.

4. The combination according to claim 3 wherein said lug is adapted to form an enclosure to the opening in the wall of said lock box for preventing access thereto.

5. The combination according to claim 1 wherein said fastening means and said lock box extend outwardly from opposed walls of said housing.

6. The combination of claim 1 further comprising fastening means received in openings in the side members of said frame for connection to said casing, the side walls of said housing being arranged to form cover members for such fastening means in said side members while said housing receives and supports said frame.

* * * * *